(12) United States Patent
Holden et al.

(10) Patent No.: US 8,967,345 B2
(45) Date of Patent: Mar. 3, 2015

(54) ADJUSTABLE REBOUND BUFFER

(71) Applicant: MSI Defense Solutions, LLC, Mooresville, NC (US)

(72) Inventors: David J. Holden, Davidson, NC (US); Andrew M. Wizorek, Davidson, NC (US); Jeffrey L. Peterson, Mooresville, NC (US)

(73) Assignee: MSI Defense Solutions, LLC, Mooresville, NC (US)

( * ) Notice: Subject to any disclaimer, the term of this patent is extended or adjusted under 35 U.S.C. 154(b) by 23 days.

(21) Appl. No.: 13/910,263

(22) Filed: Jun. 5, 2013

(65) Prior Publication Data

US 2014/0069754 A1 Mar. 13, 2014

Related U.S. Application Data

(60) Provisional application No. 61/700,038, filed on Sep. 12, 2012.

(51) Int. Cl.
*F16F 9/48* (2006.01)
*F16F 9/58* (2006.01)
*F16F 9/49* (2006.01)

(52) U.S. Cl.
CPC .. *F16F 9/585* (2013.01); *F16F 9/49* (2013.01)
USPC ........................................................ 188/285

(58) Field of Classification Search
USPC .......... 267/225; 188/266.2, 266.5, 282.6, 285
See application file for complete search history.

(56) References Cited

U.S. PATENT DOCUMENTS

| | | | |
|---|---|---|---|
| 2,336,137 | A | 12/1943 | Thornhill |
| 2,828,836 | A | 4/1958 | Kamman |
| 2,999,678 | A | 9/1961 | Heckethorn |
| 3,194,355 | A | 7/1965 | Jeromson, Jr. |
| 3,990,687 | A * | 11/1976 | Curnutt .......................... 267/225 |
| 4,298,102 | A * | 11/1981 | Nishikawa et al. ......... 188/282.6 |
| 4,325,541 | A | 4/1982 | Korosladanyi et al. |
| 4,702,355 | A * | 10/1987 | Heideman ...................... 188/285 |
| 4,765,445 | A * | 8/1988 | Komossa et al. ........... 188/266.2 |
| 5,129,490 | A * | 7/1992 | Kuehle et al. ............... 188/266.5 |
| 5,810,130 | A | 9/1998 | McCandless |
| 6,725,983 | B2 | 4/2004 | Bell |
| 6,830,256 | B2 | 12/2004 | Bryant |
| 7,021,435 | B2 | 4/2006 | Lisenker et al. |
| 7,032,727 | B2 | 4/2006 | Vanspauwen |
| 7,156,213 | B2 | 1/2007 | Vanspauwen |
| 7,360,776 | B2 | 4/2008 | Bryant |
| 7,703,585 | B2 | 4/2010 | Fox |
| 7,784,800 | B2 | 8/2010 | Michel |
| 8,091,695 | B2 * | 1/2012 | Mikonaho ...................... 188/380 |
| 8,162,112 | B2 * | 4/2012 | Gartner et al. ................. 188/285 |
| 2006/0108189 | A1 | 5/2006 | Vanspauwen |
| 2008/0116622 | A1 * | 5/2008 | Fox ............................ 267/64.28 |

(Continued)

*Primary Examiner* — Christopher Schwartz
(74) *Attorney, Agent, or Firm* — Jeffrey Watson; Balser & Grell IP Law, L.L.P.

(57) ABSTRACT

An adjustable rebound buffer includes: an outer perimeter, a central shaft hole and at least one adjustable hole. The outer perimeter is sized to fit inside a buffer cavity of the hydraulic damper. The central shaft hole is sized to fit around a damper shaft and position the adjustable rebound buffer on the damper shaft. The at least one adjustable hole provides an adjustable bleed path through the adjustable rebound buffer. A hydraulic damper with the adjustable rebound buffer includes the buffer cavity, wherein, the outer perimeter of the adjustable rebound buffer is adapted to fit inside the buffer cavity as the hydraulic damper approaches full extension.

22 Claims, 10 Drawing Sheets

(56) References Cited

U.S. PATENT DOCUMENTS

| | | |
|---|---|---|
| 2008/0179795 A1 | 7/2008 | Fox |
| 2009/0084644 A1* | 4/2009 | Murakami ................ 188/266.6 |
| 2009/0277734 A1* | 11/2009 | Cox et al. ...................... 188/285 |
| 2012/0018264 A1 | 1/2012 | King |
| 2012/0090931 A1 | 4/2012 | Krazewski et al. |

* cited by examiner

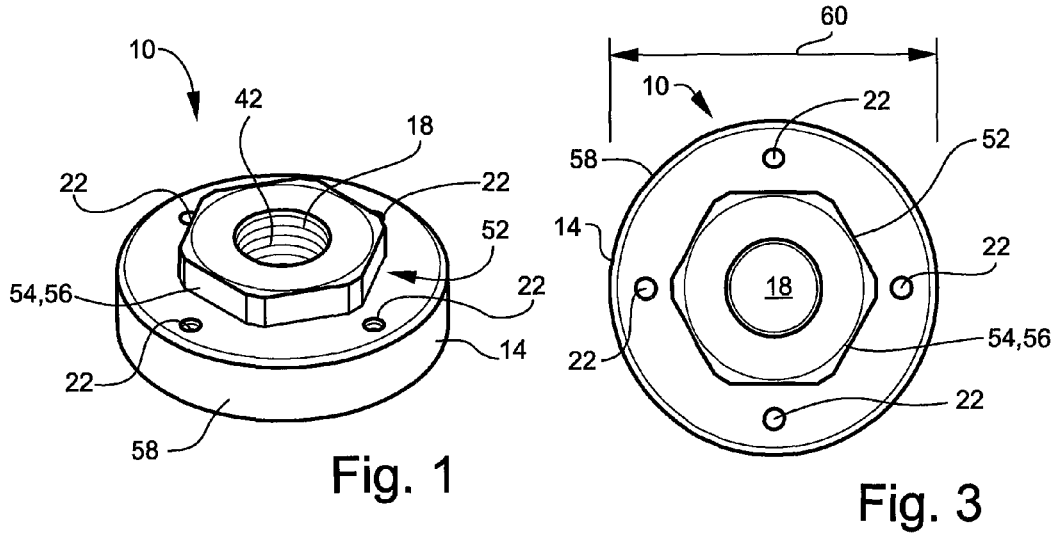
Fig. 1
Fig. 3
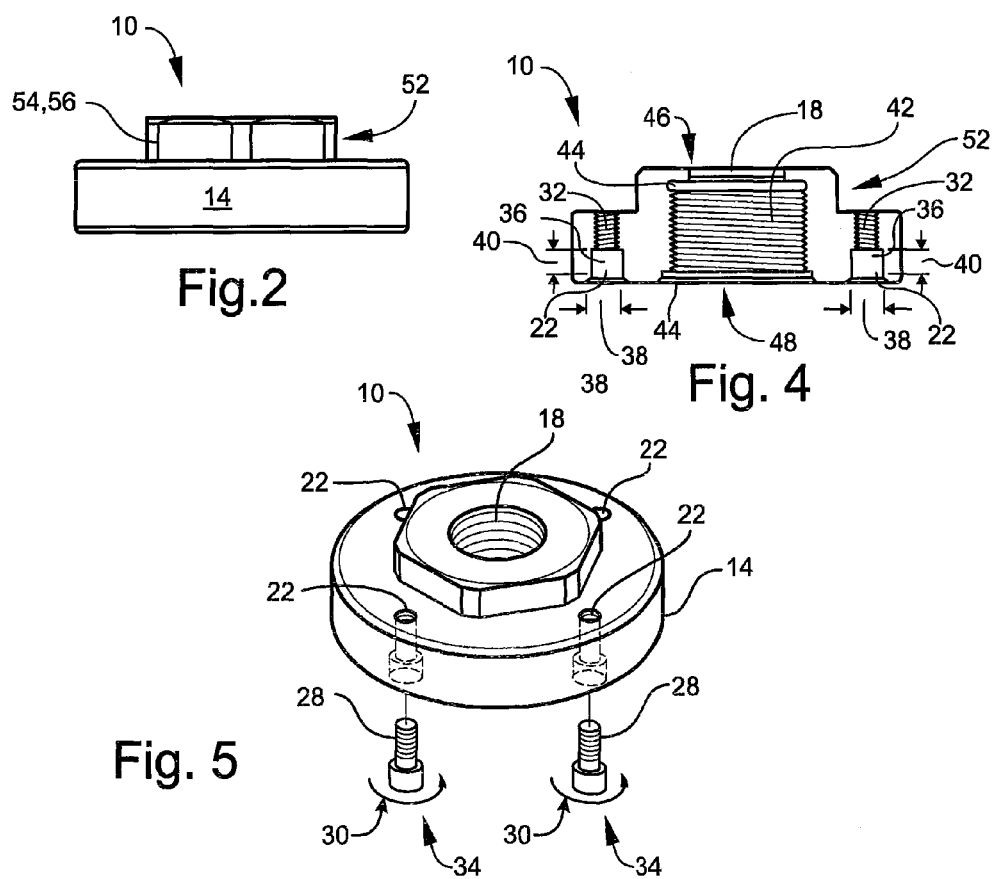
Fig. 2
Fig. 4
Fig. 5

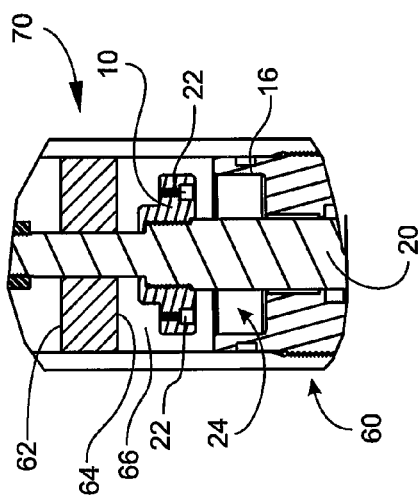
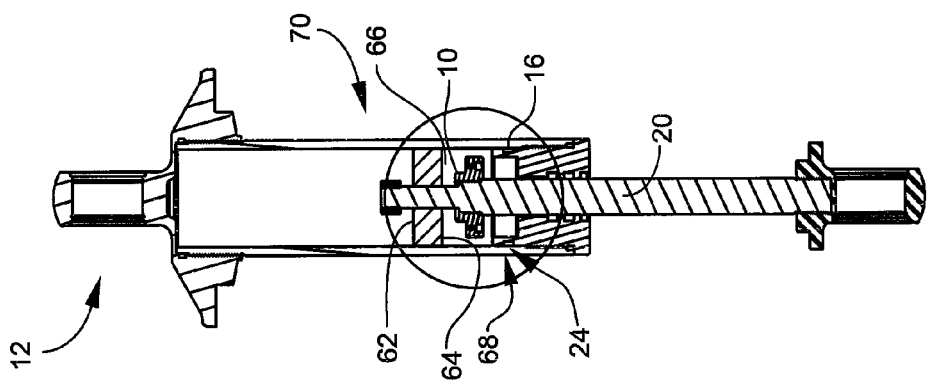
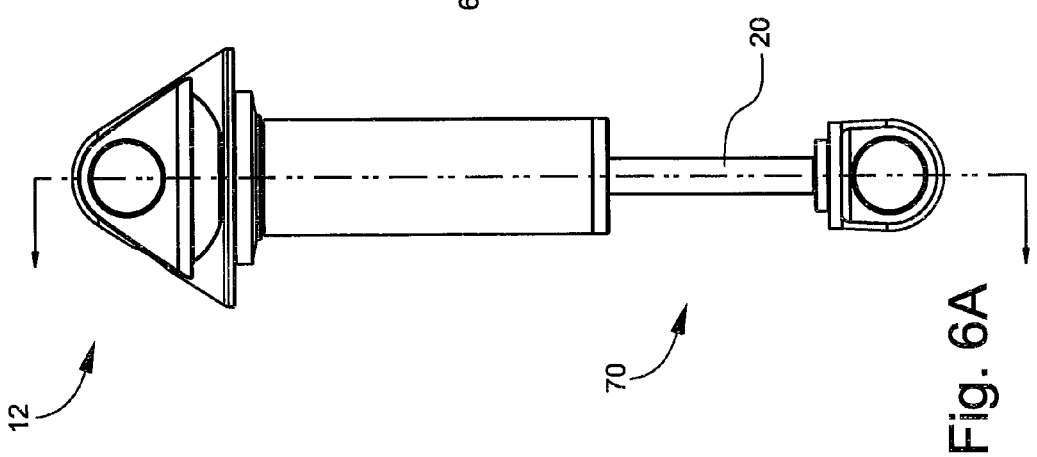
Fig. 6C
Fig. 6B
Fig. 6A

ADJUSTABLE REBOUND BUFFER

CROSS-REFERENCE TO RELATED APPLICATIONS

This application claims priority to U.S. Provisional Patent Application Ser. No. 61/700,038, filed Sep. 12, 2012, which is incorporated herein by reference in its entirety.

FIELD OF INVENTION

The instant invention relates to hydraulic dampers and more particularly to an adjustable rebound buffer for a hydraulic damper.

BACKGROUND OF THE INVENTION

A typical hydraulic damper (also known as a shock absorber or dashpot) is a mechanical device designed to smooth out or dampen shock impulses, and dissipate kinetic energy. Pneumatic and hydraulic shock absorbers commonly take the form of a cylinder with a sliding piston inside. The cylinder is filled with a liquid (such as hydraulic fluid) or air. Shock absorbers may include cushions and/or springs. The shock absorber's function in the suspension system of a vehicle is to absorb or dissipate energy acting on the vehicle. While shock absorbers may also serve the purpose of limiting excessive suspension movement, their intended main purpose is to dampen spring oscillations. Shock absorbers use valving of oil and gases to absorb excess energy from the springs. Vehicles typically employ both hydraulic shock absorbers and coil springs or torsion bars. In such a suspension system, "shock absorber" typically refers specifically to the hydraulic piston that absorbs and dissipates (i.e. dampens) vibration.

One problem commonly associated with hydraulic dampers occurs during full extension of the hydraulic damper at high velocities. When this situation occurs, the piston hits the end of the rebound chamber and leads to vibrations, which can lead to parts wearing out and/or breaking. This impact of the piston hitting the end of the rebound chamber at full extension also dissipates its energy through the chassis of the vehicle, which can be harsh on the vehicle operator and/or passengers. This energy dissipated from the impact can reduce the overall reliability and/or durability of, not just the suspension system, but the overall vehicle system. As such, there is clearly a need to dampen the impact of the piston hitting the end of the rebound chamber, especially during high velocities.

A rebound buffer is designed as such a device to dampen the impact of the piston hitting the end of the rebound chamber. Current rebound buffers include flexible materials placed in the rebound chamber. These flexible materials are adequate for providing a rebound buffer with a set damping characteristic. However, these flexible material rebound buffers are known to wear out over time. In addition, these flexible rebound buffers do not allow for the damping characteristic of the rebound buffer to be adjusted, as they are set based on the type and size of material used. Thus, there is clearly a need to provide a rebound buffer for a hydraulic shock that is durable or lasts longer, and one that may be adjustable.

The instant invention is designed to provide an adjustable rebound buffer that addresses the above mentioned problems.

SUMMARY OF THE INVENTION

The instant invention is directed toward an adjustable rebound buffer and a hydraulic damper including such an adjustable rebound buffer. The adjustable rebound buffer includes: an outer perimeter, a central shaft hole and at least one adjustable hole. The outer perimeter is sized to fit inside a buffer cavity of the hydraulic damper. The central shaft hole is sized to fit around a damper shaft and position the adjustable rebound buffer on the damper shaft. The at least one adjustable hole provides an adjustable bleed path through the adjustable rebound buffer. The hydraulic damper with the adjustable rebound buffer includes a buffer cavity, wherein, the outer perimeter of the adjustable rebound buffer is adapted to fit inside the buffer cavity as the hydraulic damper approaches full extension.

BRIEF DESCRIPTION

For the purpose of illustrating the invention, there is shown in the drawings a form that is presently preferred; it being understood, however, that this invention is not limited to the precise arrangements and instrumentalities shown.

FIG. 1 is a perspective view of the adjustable rebound buffer according to one embodiment of the instant invention.

FIG. 2 is a side view of the adjustable rebound buffer shown in FIG. 1.

FIG. 3 is a top view of the adjustable rebound buffer shown in FIG. 1.

FIG. 4 is a cross-sectional view of the rebound buffer shown in FIG. 1.

FIG. 5 is a partially disassembled perspective view of the adjustable rebound buffer shown in FIG. 1 with the bleed pins partially disassembled.

FIG. 6A is a side view of a hydraulic damper including the adjustable rebound buffer according to one embodiment of the instant invention.

FIG. 6B is a cross-sectional view of the hydraulic damper shown in FIG. 6A.

FIG. 6C is a zoomed in view of the hydraulic damper shown in FIG. 6B.

DETAILED DESCRIPTION OF THE INVENTION

Figure 7:
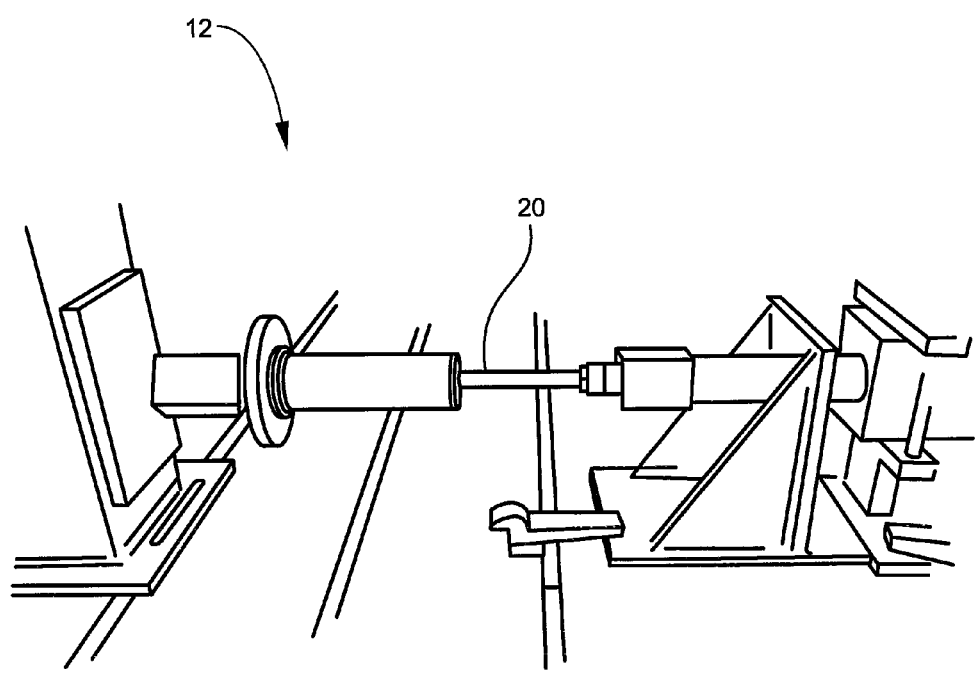
FIG. 7 is an environmental view of the testing equipment used for testing the hydraulic damper with the adjustable rebound buffer according to one embodiment of the instant invention.
Figure 8:
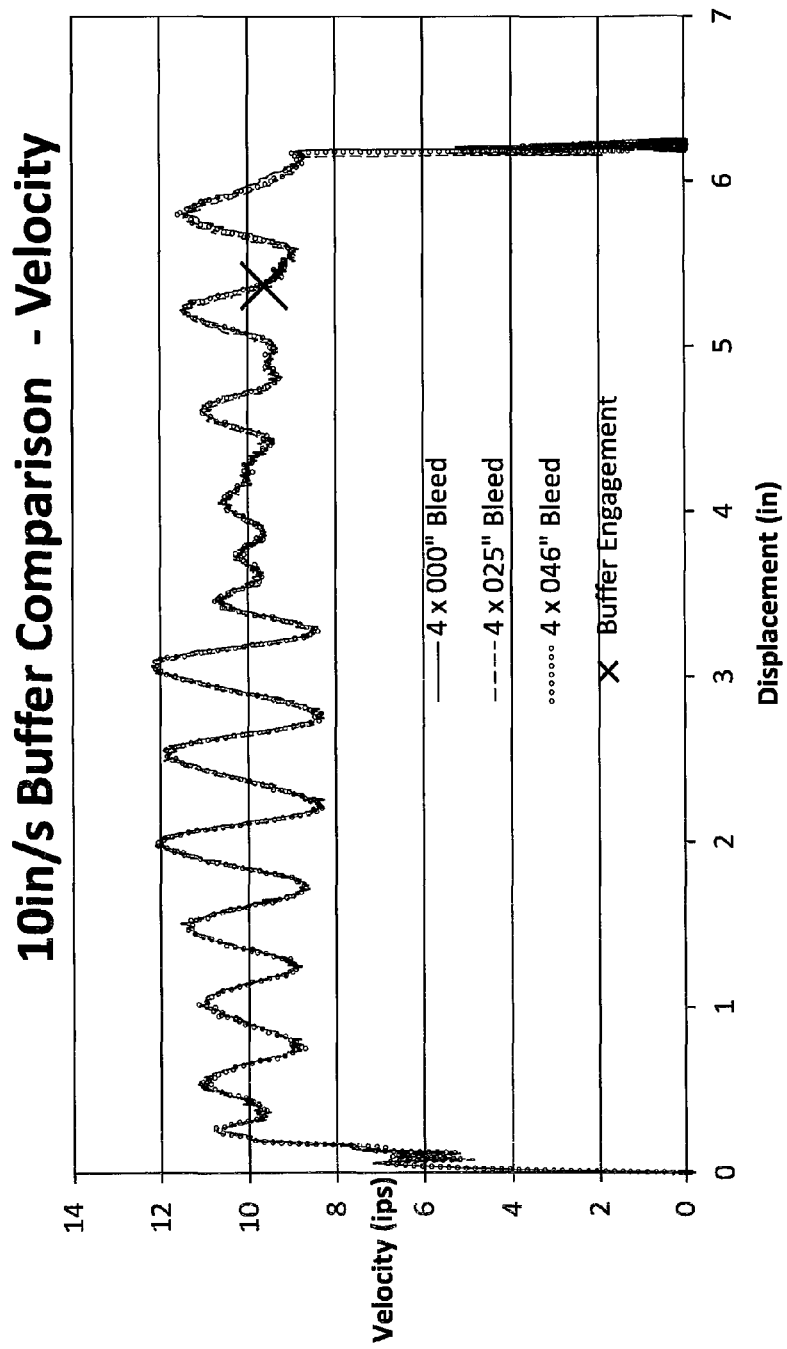
FIG. 8 is a graph showing velocity versus displacement for a 10 in/s buffer comparison for various size bleed pins according to one embodiment of the instant invention.
Figure 9:
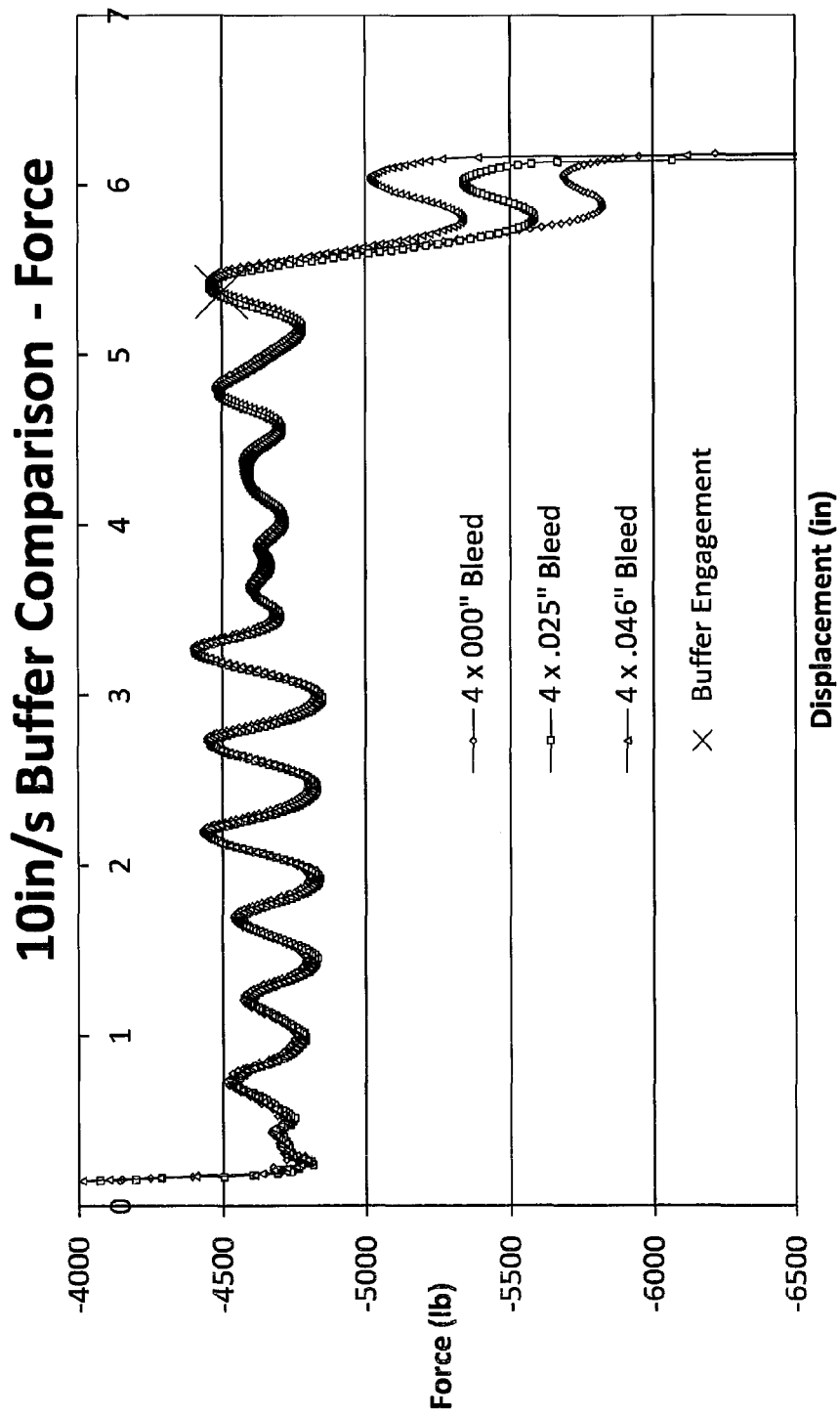
FIG. 9 is a graph showing force versus displacement for a 10 in/s buffer comparison for various size bleed pins according to one embodiment of the instant invention.
Figure 10:
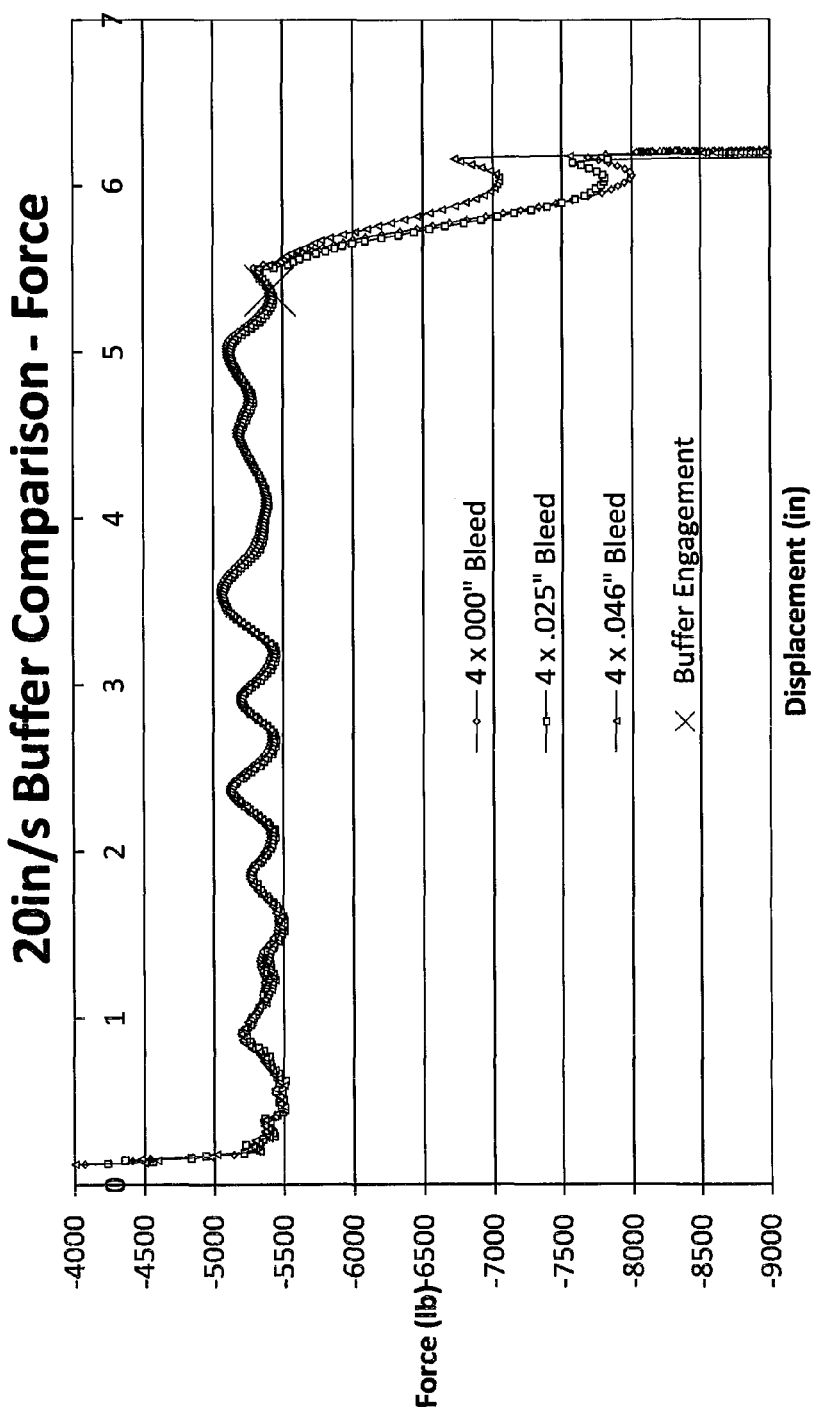
FIG. 10 is a graph showing force versus displacement for a 20 in/s buffer comparison for various size bleed pins according to one embodiment of the instant invention.
Figure 11:
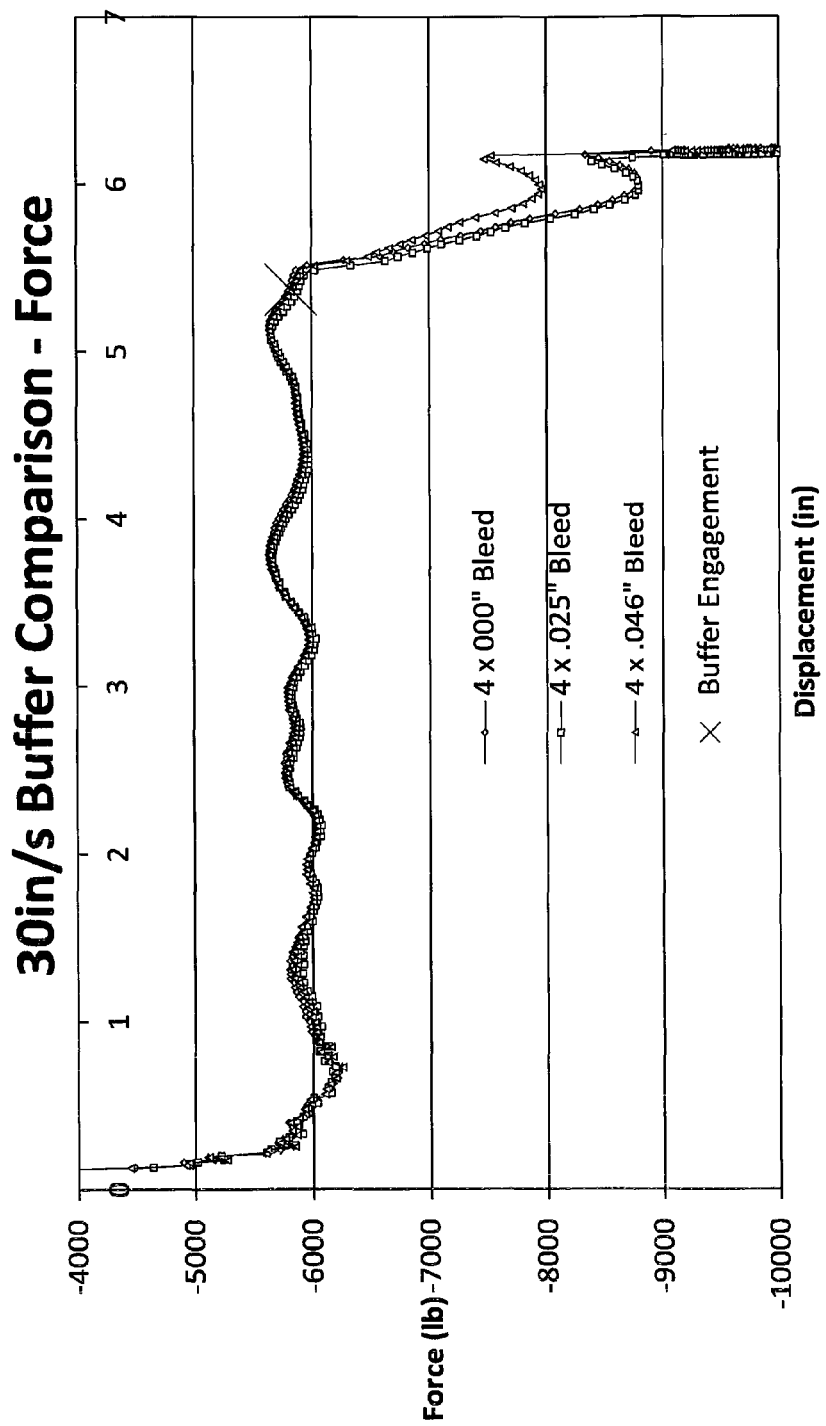
FIG. 11 is a graph showing force versus displacement for a 30 in/s buffer comparison for various size bleed pins according to one embodiment of the instant invention.
Figure 12:
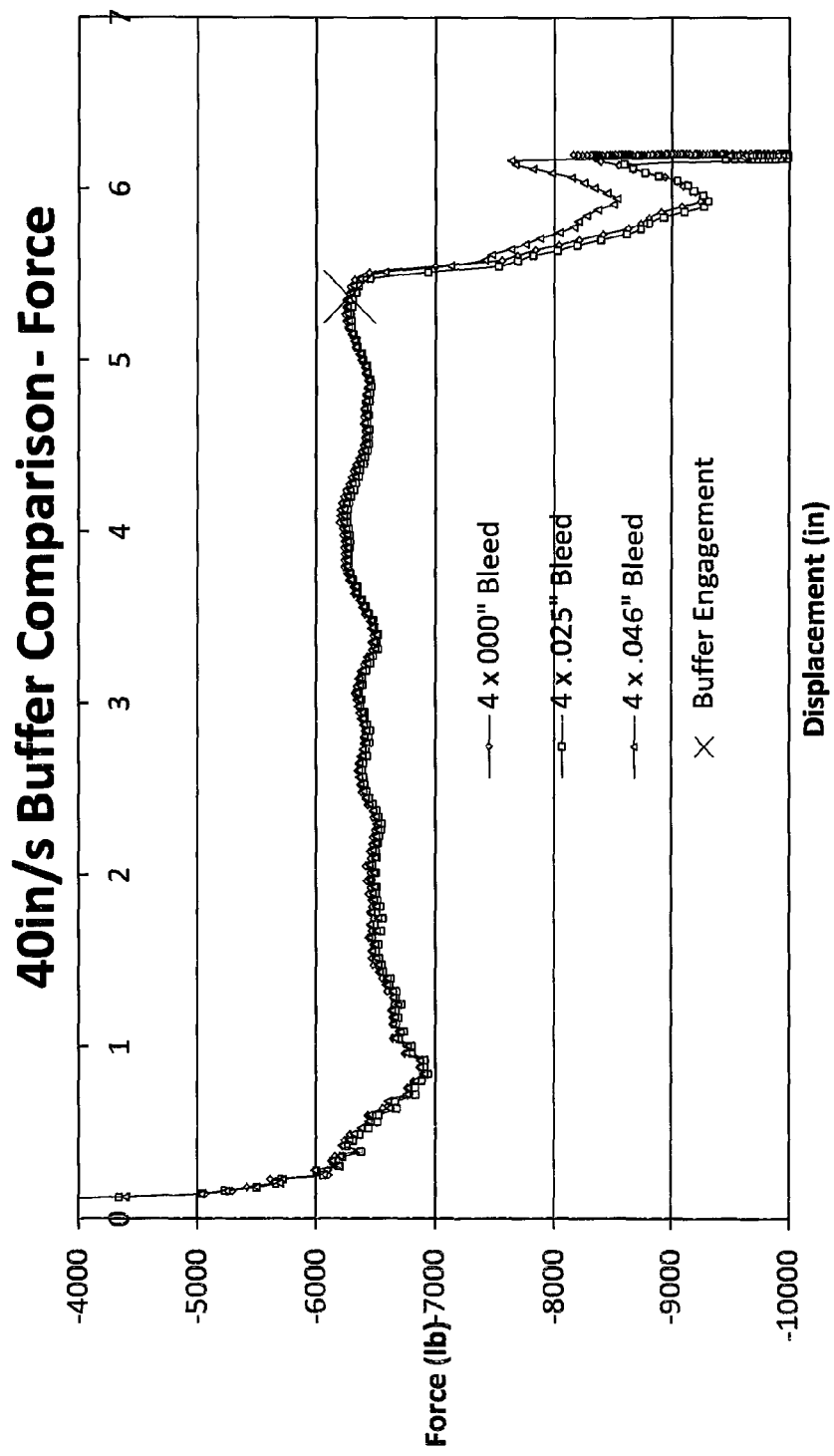
FIG. 12 is a graph showing force versus displacement for a 40 in/s buffer comparison for various size bleed pins according to one embodiment of the instant invention.
Figure 13:
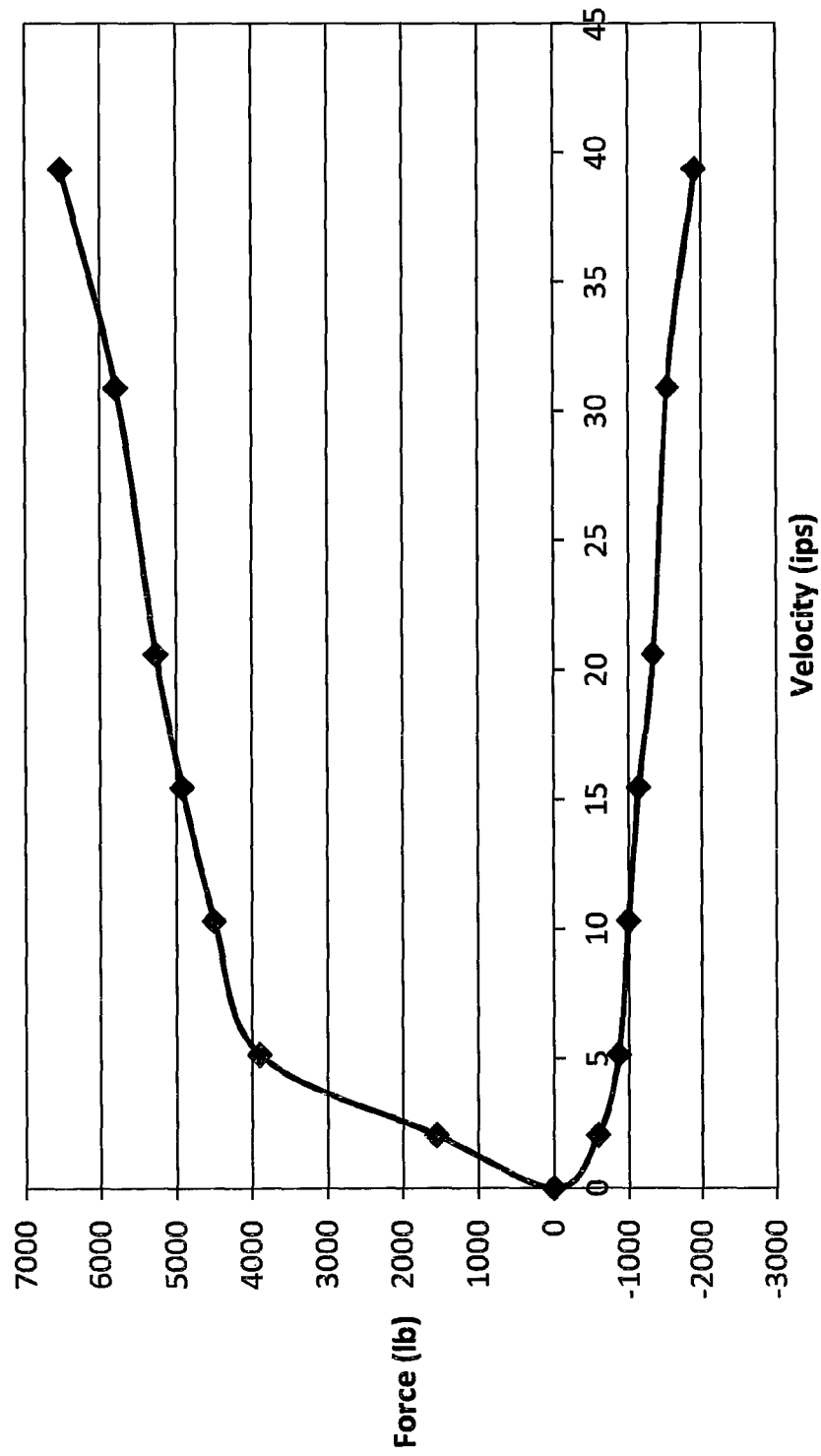
FIG. 13 is a graph showing force versus velocity according to one embodiment of the instant invention.

Referring to the drawings, wherein like numerals indicate like elements, there is shown in the Figures an embodiment of an adjustable rebound buffer 10 (see FIGS. 1-6) for a hydraulic damper 12 (see FIGS. 6-7). The adjustable rebound buffer 10 may be designed to have an adjustable bleed path 24, thereby allowing the adjustable rebound buffer 10 and hydraulic damper 12 to have its rebound buffering adjusted. The purpose of the adjustable rebound buffer 10 may be to absorb some of the energy when a hydraulic damper is pulled into full extension at high velocities. In general, the adjustable rebound buffer 10 includes an outer perimeter 14, a central shaft hole 18, and at least one adjustable hole 18. These parts are shown in the Figures and are described in greater detail below.

The outer perimeter 14 may be included in adjustable rebound buffer 10. See FIGS. 1-3 and 5. The outer perimeter 14 may be the outermost perimeter, sides, curves, etc. of adjustable rebound buffer 10. Outer perimeter 14 may be sized to fit inside the buffer cavity 16 provided in the hydraulic damper 12. See FIG. 6. Outer perimeter 14 may be any size or shape adapted to fit inside buffer cavity 16. In the embodiment shown in the Figures, outer perimeter 14 may have a circular shape 58 adapted to fit inside circular shaped buffer cavity 16. However, the invention is not so limited and outer perimeter 14 may have other shapes adapted to fit into a correspondingly shape buffer cavity 16, like, oval, square, triangular, hexagon, octagon, etc. The dimensions of outer perimeter 14 and buffer cavity 16 may be any desired size adapted to fit inside any sized hydraulic damper 12, including, but not limited to, any sized diameter 60. In one embodiment, outer perimeter 14 may be circular shape 58 and have a diameter 60 of approximately 2.244 inches. Outer perimeter 14 may be dimensioned slightly smaller than the inner wall of buffer cavity 16. In one embodiment, outer perimeter 14 may be sized with a tolerance of less than 0.01 from said inner wall to buffer cavity 16. In another embodiment, outer perimeter 14 may be sized with a tolerance of less than 0.005 from said inner wall to buffer cavity 16. In yet another embodiment, outer perimeter 14 may be sized with a tolerance of between 0.002 and 0.005 inches from said inner wall to buffer cavity 16.

Central shaft hole 18 may be included in adjustable rebound buffer 10. See FIGS. 1 and 3-6. Central shaft hole 18 may be for attaching adjustable rebound buffer 10 to the damper shaft 20 of hydraulic shock 12. Central shaft hole 18 may be any shape or size hole and include any means for attaching adjustable rebound buffer 10 to the damper shaft 20. The central shaft hole 18 may be designed to fit around any size or shape damper shaft 20. Central shaft hole 18 may be sized to fit around damper shaft 20 and position adjustable rebound buffer 10 on the damper shaft 20. In one embodiment, central shaft hole 18 may be threaded with central shaft hole threads 42.

The threaded central shaft hole 18 may allow the adjustable rebound buffer to be screwed onto shaft 20 and positioned at various positions on shaft 20 along central shaft hole threads 42. The threaded central shaft hole 18 may have any desired size diameter and any type of threads to fit any sized diameter shaft 20 with any various threads. As an example, the diameter of threaded central shaft hole 18 may be approximately 0.938 and have 15/16-16 UN-2B threads. In one embodiment, the threaded central shaft hole 18 may include thread relief portions 44 at the top 46 and bottom 48 of the threaded central shaft hole 18. The central shaft hole 18 may be adapted to attach and position the adjustable rebound buffer 10 by any means. The thread relief portions 44 may be for strength and/or fatigue strength in the rebound stroke. Thread relief portions 44 may reduce and/or eliminate any cracks from occurring. Thread relief portions 44 may have any size or shape, including, but not limited to, having any size diameter 50. In one embodiment, diameter 50 of thread relief portions may be approximately 1.005 inches.

At least one adjustable hole 22 may be provided in adjustable rebound buffer 10. See FIGS. 1 and 3-6. The at least one adjustable holes 22 may be for providing an adjustable bleed path 24 through adjustable rebound buffer 10. Adjustable holes 22 may be any size or shaped adjustable holes and may include any means for adjustment for providing the adjustable bleed path 24 through adjustable rebound buffer 10. There may be any number of adjustable holes 22 including one or multiple adjustable holes. In the embodiment shown in the Figures, there are four adjustable holes 22. However, the invention is not so limited and any number of adjustable holes 22 may be included in adjustable rebound buffer 10. 8. The adjustable holes 22 may be provide anywhere in adjustable rebound buffer 10. In one embodiment, the plurality of adjustable holes 22 may be spaced equally around adjustable rebound buffer 10. This embodiment may provide for a more even adjustable bleed path 24 through adjustable rebound buffer 10, which may provide a more durable and/or longer lasting adjustable rebound buffer 10. The adjustable holes 22 may be adjustable by any means. In one embodiment, the adjustable holes 22 may be adjustable via a corresponding number of bleed pins 28.

Bleed pins 28 may be included in each of the adjustable holes of adjustable rebound buffer 10. See FIG. 5. There may be any number of bleed pins 28 including, a plurality of bleed pins 28 that correspond to the amount of adjustable holes 22 in adjustable rebound buffer 10. In one embodiment, there may be multiple bleed pins 28 for each adjustable hole 22 where each adjustable hole 22 may have multiple sized bleed pins 28 for adjusting the bleed path through each adjustable hole 22. Each of the bleed pins 28 may have a bleed orifice 30 there through. The bleed orifices 30 for each of the bleed pins 28 may vary in size thereby providing various bleed paths that allow more or less fluid to flow through them. Whereby, the bleed through the adjustable rebound buffer 10 may be adjusted by changing one or more of the bleed pins 28, or all of the bleed pins 28 simultaneously. The bleed pins 28 may be adapted to fit in each of the adjustable holes 22 by any means. In one embodiment, the adjustable holes 22 may be threaded holes 32, and the bleed pins 28 may be hollow screws 34 adapted to screw into the threaded holes 32. In one embodiment, the threaded holes 32 provided as the adjustable holes 22 may be 4-40 UNF-2B threaded holes and the hollow screws 34 may be have corresponding threads for the 4-40 UNF-2B threaded holes. In one embodiment, each of the threaded holes 32 may include a recess 36 for housing the top portion of the hollow screws 34 (i.e. the head: phillips, flat, allen key, star, etc.). The recesses 36 may be any size or shape, including, but not limited to, having any size recess diameter 38 and any recess depth 40. For example, in one embodiment the recess diameter 38 may be approximately 0.212 inches, and the recess depth 40 may be approximately 0.225 inches.

Each of the plurality of bleed pins 28 may have a bleed orifice 30 there through, where the bleed orifices 30 for each of the different bleed pins 28 may vary in size thereby allowing more or less fluid to flow through them. Changing the size of bleed orifice 30 of the bleed pins 28, or by using bleed pins with different sized bleed orifices 30, may change the amount of damping the rebound buffer 10 contributes. See FIGS. 8-12 for Examples of various sized bleed pins. Consequently, one can adjust the bleed through the adjustable rebound buffer 10 (i.e. the rebound damping) by changing one or more of the bleed pins 28, or all of the bleed pins 28 simultaneously.

In addition to various sized bleed pins 28, a plug or a number of plugs may be included with the instant invention.

The plug or plugs may be provided to be inserted into one or more of the adjustable holes 22 for plugging the bleed path through that adjustable hole. The plugs may be any size or shape device for plugging or blocking the flow through adjustable holes 22. In one embodiment, the plugs may be shaped similar to bleed pins 28 but without the bleed orifice 30. Thus, a plug may be inserted into an adjustable hole 22 or multiple plugs may be inserted into adjustable hole 22 for adjusting the bleed path 24 through adjustable rebound buffer 10.

A raised portion 52 may optionally be included on adjustable rebound buffer 10. See FIGS. 1-5. Raised portion 52 may be used for maneuvering adjustable rebound buffer 10. Raised portion 52 may be any size or shape adapted for maneuvering adjustable rebound buffer 10. In one embodiment, raised portion 52 may have a shape 54 for fitting a tool for rotating the adjustable rebound buffer 10. Shape 54 may be any desired shape for fitting any desired tool, including, but not limited to, a triangular shape, square, rectangular shape, hexagon shape, circular, etc. In one embodiment, shape 52 may be a 1.25 inch wide hexagonal shape 56.

A hydraulic damper 12 may be provided with adjustable rebound buffer 10. See FIGS. 6-7. Hydraulic damper 12 may be any type, size or shape hydraulic damper. Hydraulic damper 12 may include the buffer cavity 16 for receiving adjustable rebound buffer 10. Whereby, the outer perimeter 14 of adjustable rebound buffer 10 may be adapted to fit inside buffer cavity 16 as the hydraulic damper 12 approaches full extension 70. See FIG. 6. The hydraulic damper 12 may include a damper shaft 22 with a piston 62, as commonly known in the art. The adjustable rebound buffer 10 may be attached to the damper shaft 20 approximate to piston 62 on the rebound chamber side 64 of piston 62. The buffer cavity 16 may be positioned at the end 68 of rebound chamber 66.

In operation, when hydraulic damper 12 approaches full extension 70, adjustable rebound buffer 10 may enter buffer cavity 16 and fluid from buffer cavity 16 may be forced through the adjustable bleed path 24 of adjustable rebound buffer 10. This movement of fluid through adjustable bleed path 24 of adjustable rebound buffer 10 may dampen the full extension of hydraulic damper 12.

The instant invention also includes a method of adjusting the rebound damping effects of hydraulic damper 12. This method may include the steps of: providing an adjustable rebound buffer 10 as shown and described herein; providing a hydraulic damper 12 as shown and described herein with a buffer cavity 16; attaching the adjustable rebound buffer 10 to the damper shaft 20 of hydraulic damper 12; and adjusting the adjustable bleed path 24 through adjustable rebound buffer 10.

As shown in FIGS. 7-13, a hydraulic damper 12 with the adjustable rebound buffer of the instant invention was constructed and tested. As stated before, the purpose of the adjustable rebound buffer 10 may be to absorb some of the energy when a hydraulic damper 12 is pulled into full extension at high velocities. The test equipment shown in FIG. 7 was designed to pull the hydraulic damper 12 into full extension 70 at high velocities and measure the damping characteristics of adjustable rebound buffer 10. The test results shown in FIGS. 8-13 show that the instant invention provides adjustable energy absorption when hydraulic damper 12 was pulled into full extension at high velocities.

Figure 14:
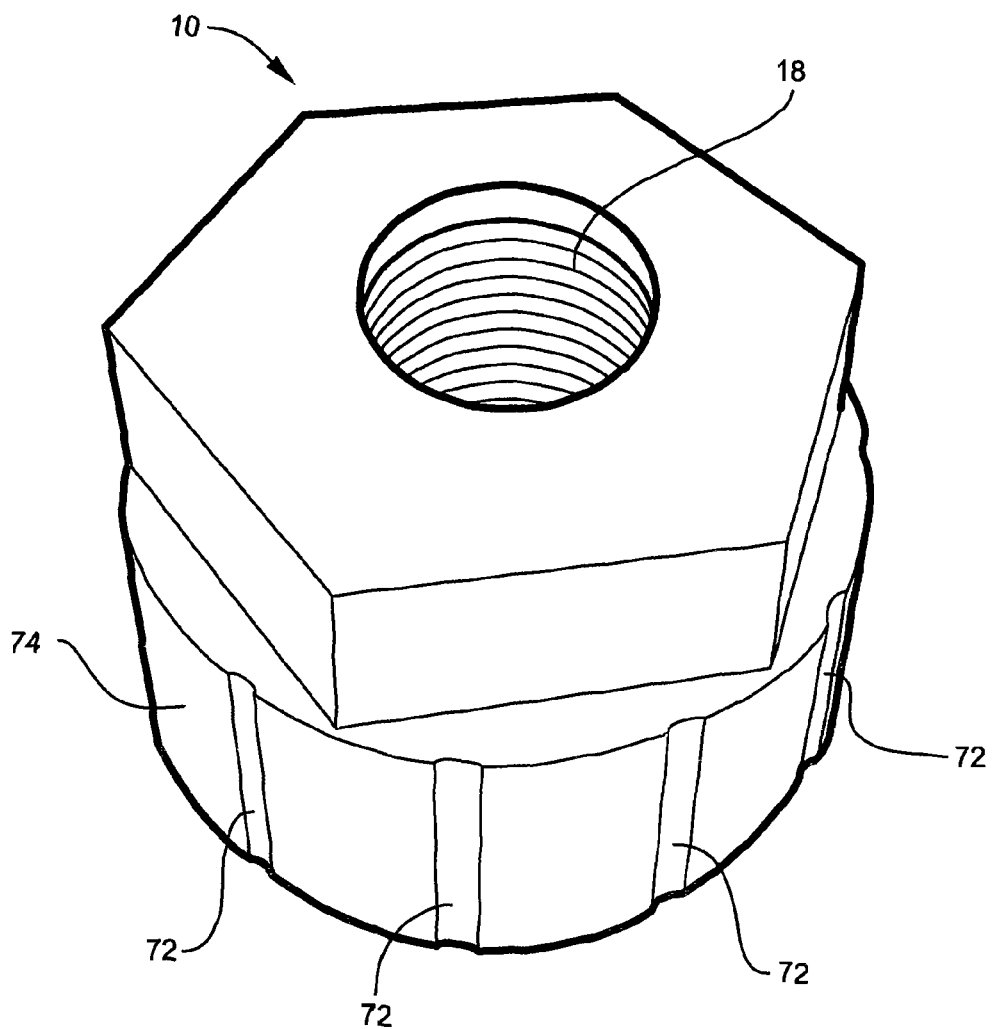
FIG. 14 is a perspective view of an adjustable rebound buffer according to another embodiment of the instant invention.

Referring to FIG. 14, an embodiment of the adjustable rebound buffer 10 is shown. In this embodiment, the adjustable bleed paths 24 are provided by grooves 72 or notches 72, etc. and/or the like positioned on the outer surface 74 around the circumference of the adjustable rebound buffer 10 (as opposed to through the interior of the adjustable rebound buffer through adjustable holes 22, as shown in FIG. 1). In one embodiment, then adjustable rebound buffer 10 may not include adjustable bleed holes 22 and the bleed paths may be provided solely by the notches 72 machined into the outer surface 74 of the buffer. In another embodiment, (not shown) the adjustable rebound buffer 10 may include both adjustable holes 22 and notches 72. In this combined embodiment, the bleed paths may be provided by both the adjustable holes 22 in combination with the notches 72 around the outer surface 74 of the buffer. For example, if the rebound buffer force needed to be changed (increased) in the field or on the job, the notches 72 could be added to the adjustable rebound buffer 10 with a simple tool. As another example, once the desired force has been tailored through the use of the threaded bleed pins 28 in adjustable holes 22, the same buffer can be CNC machined, and then tuned to the application, whilst making the same basic rebound buffer for a wide variety of applications, varying to depth and number of the notches 72 for varying the performance.

The present invention may be embodied in other forms without departing from the spirit and the essential attributes thereof, and, accordingly, reference should be made to the appended claims, rather than to the foregoing specification, as indicated the scope of the invention.

We claim:

1. An adjustable rebound buffer for a hydraulic damper comprising:
   an outer perimeter sized to fit inside a buffer cavity of the hydraulic damper;
   a central shaft hole sized to fit around a damper shaft and position said adjustable rebound buffer on the damper shaft;
   at least one adjustable hole providing an adjustable bleed path through said adjustable rebound buffer; and
   a plurality of bleed pins adapted to fit in each of said adjustable holes;
   each of said plurality of bleed pins having a bleed orifice therethrough, where said bleed orifices for each of said bleed pins varying in size thereby allowing more or less fluid to flow through them;
   whereby, the bleed through said adjustable rebound buffer may be adjusted by changing one or more of the bleed pins, or all of the bleed pins simultaneously.

2. The adjustable rebound buffer of claim 1 wherein each of said adjustable holes being threaded holes, and said bleed pins being hollow screws adapted to screw into said threaded holes.

3. The adjustable rebound buffer of claim 2 wherein each of said threaded holes including a recess for housing the top portion of said hollow screws.

4. The adjustable rebound buffer of claim 3 wherein said recesses having a diameter of approximately 0.212 inches and a depth of approximately 0.225 inches.

5. The adjustable rebound buffer of claim 2 wherein said threaded holes being 4-40 UNF-2B threaded holes.

6. The adjustable rebound buffer of claim 1 comprising a plurality of adjustable holes around said adjustable rebound buffer.

7. The adjustable rebound buffer of claim 6, wherein said plurality of adjustable holes being spaced equally around said adjustable rebound buffer.

8. The adjustable rebound buffer of claim 7 comprising four adjustable holes equally spaced around said adjustable rebound buffer.

9. The adjustable rebound buffer of claim 1 wherein said central shaft hole being threaded.

10. The adjustable rebound buffer of claim 9 wherein said threaded central shaft hole including thread relief portions at the top and bottom of said threaded central shaft hole.

11. The adjustable rebound buffer of claim 10 wherein said thread relief portions having a diameter of approximately 1.005 inches.

12. The adjustable rebound buffer of claim 9 wherein said threaded central shaft hole having a diameter of approximately 0.938 and having 15/16-16 UN-2B threads.

13. The adjustable rebound buffer of claim 1 including a raised portion adapted for maneuvering said adjustable rebound buffer, said raised portion having a shape for fitting a tool for rotating said adjustable rebound buffer.

14. The adjustable rebound buffer of claim 13 wherein said shape being a 1.25 inch wide hexagonal shape.

15. The adjustable rebound buffer of claim 1 wherein said outer perimeter being circular and having a diameter of approximately 2.244 inches.

16. A hydraulic damper with an adjustable rebound buffer comprising:
an adjustable rebound buffer comprising:
an outer perimeter adapted to fit inside a buffer cavity of the hydraulic damper;
a central shaft hole adapted to fit around a damper shaft and position said adjustable rebound buffer on the damper shaft;
at least one adjustable hole providing an adjustable bleed path through said adjustable rebound buffer; and
a plurality of bleed pins adapted to fit in each of said adjustable holes;
each of said plurality of bleed pins having a bleed orifice therethrough, where said bleed orifices for each of said bleed pins varying in size thereby allowing more or less fluid to flow through them;
whereby, the bleed through said adjustable rebound buffer may be adjusted by changing one or more of the bleed pins, or all of the bleed pins simultaneously;
whereby, said adjustable rebound buffer having an adjustable bleed.

17. The hydraulic damper with an adjustable rebound buffer of claim 16 further comprising:
a buffer cavity;
wherein said outer perimeter of said adjustable rebound buffer being adapted to fit inside said buffer cavity as the hydraulic damper approaches full extension.

18. The hydraulic damper with an adjustable rebound buffer of claim 17 wherein:
said adjustable rebound buffer being attached to the damper shaft approximate to a piston on a rebound chamber side of said piston; and
said buffer cavity being positioned at the end of said rebound chamber;
when said hydraulic damper approaching full extension, said adjustable rebound buffer entering said buffer cavity and fluid from said buffer cavity being forced through the bleed of said adjustable rebound buffer, whereby said adjustable rebound buffer damping the full extension of said hydraulic damper.

19. A method of adjusting the rebound damping effects of a hydraulic damper including the step of:
providing an adjustable rebound buffer comprising:
an outer perimeter adapted to fit inside a buffer cavity of a hydraulic damper;
a central shaft hole adapted to fit around a damper shaft and position said adjustable rebound buffer on the damper shaft;
at least one adjustable hole providing an adjustable bleed path through said adjustable rebound buffer; and
a plurality of bleed pins adapted to fit in each of said adjustable holes;
each of said plurality of bleed pins having a bleed orifice therethrough, where said bleed orifices for each of said bleed pins varying in size thereby allowing more or less fluid to flow through them;
whereby, the bleed through said adjustable rebound buffer may be adjusted by changing one or more of the bleed pins, or all of the bleed pins simultaneously;
whereby, said adjustable rebound buffer having an adjustable bleed;
providing a hydraulic damper having a buffer cavity;
attaching said adjustable rebound buffer to a damper shaft of said hydraulic damper; and
adjusting said adjustable bleed path through said adjustable rebound buffer.

20. An adjustable rebound buffer for a hydraulic damper comprising:
an outer perimeter sized to fit inside a buffer cavity of the hydraulic damper;
a central shaft hole sized to fit around a damper shaft and position said adjustable rebound buffer on the damper shaft;
at least one adjustable hole providing an adjustable bleed path through said adjustable rebound buffer; and
a raised portion adapted for maneuvering said adjustable rebound buffer, said raised portion having a shape for fitting a tool for rotating said adjustable rebound buffer.

21. A hydraulic damper with an adjustable rebound buffer comprising:
an adjustable rebound buffer comprising:
an outer perimeter adapted to fit inside a buffer cavity of the hydraulic damper;
a central shaft hole adapted to fit around a damper shaft and position said adjustable rebound buffer on the damper shaft;
at least one adjustable hole providing an adjustable bleed path through said adjustable rebound buffer; and
a raised portion adapted for maneuvering said adjustable rebound buffer, said raised portion having a shape for fitting a tool for rotating said adjustable rebound buffer;
whereby, said adjustable rebound buffer having an adjustable bleed.

22. A method of adjusting the rebound damping effects of a hydraulic damper including the step of:
providing an adjustable rebound buffer comprising:
an outer perimeter adapted to fit inside a buffer cavity of a hydraulic damper;
a central shaft hole adapted to fit around a damper shaft and position said adjustable rebound buffer on the damper shaft;
at least one adjustable hole providing an adjustable bleed path through said adjustable rebound buffer;
a raised portion adapted for maneuvering said adjustable rebound buffer, said raised portion having a shape for fitting a tool for rotating said adjustable rebound buffer;
whereby, said adjustable rebound buffer having an adjustable bleed;
providing a hydraulic damper having a buffer cavity;
attaching said adjustable rebound buffer to a damper shaft of said hydraulic damper; and
adjusting said adjustable bleed path through said adjustable rebound buffer.

* * * * *